US008825353B2

(12) United States Patent
Mori et al.

(10) Patent No.: US 8,825,353 B2
(45) Date of Patent: Sep. 2, 2014

(54) PARKING SUPPORT SYSTEMS, PARKING SUPPORT METHODS, AND PARKING SUPPORT PROGRAMS

(75) Inventors: Toshihiro Mori, Okasaki (JP); Tomoki Kubota, Okasaki (JP); Yuuichi Ooshita, Nagoya (JP)

(73) Assignee: Aisin AW Co., Ltd., Anjo (JP)

( * ) Notice: Subject to any disclaimer, the term of this patent is extended or adjusted under 35 U.S.C. 154(b) by 1067 days.

(21) Appl. No.: 12/232,069

(22) Filed: Sep. 10, 2008

(65) Prior Publication Data

US 2009/0088959 A1 Apr. 2, 2009

(30) Foreign Application Priority Data

Sep. 28, 2007 (JP) ................................ 2007-255569

(51) Int. Cl.

| | |
|---|---|
| ***G06F 19/00*** | (2011.01) |
| ***G06G 7/70*** | (2006.01) |
| ***G06G 7/76*** | (2006.01) |
| ***G08G 1/00*** | (2006.01) |
| ***G08G 1/14*** | (2006.01) |
| ***G08G 1/01*** | (2006.01) |

(52) U.S. Cl.
CPC ................ *G08G 1/14* (2013.01); *G08G 1/0104* (2013.01)
USPC ......... 701/118; 701/117; 340/932.2; 340/934

(58) Field of Classification Search
USPC ................ 701/117, 118; 340/932.2, 934, 937
See application file for complete search history.

(56) References Cited

U.S. PATENT DOCUMENTS

| | | | |
|---|---|---|---|
| 4,527,155 | A | 7/1985 | Yamaki et al. |
| 5,123,085 | A | 6/1992 | Wells et al. |
| 5,280,577 | A | 1/1994 | Trevett et al. |
| 5,469,514 | A | 11/1995 | Kawamura |
| 5,559,938 | A | 9/1996 | Van Roekel et al. |
| 5,724,072 | A | 3/1998 | Freeman et al. |
| 5,790,714 | A | 8/1998 | McNeil et al. |
| 6,128,573 | A | 10/2000 | Nomura |
| 6,281,808 | B1 | 8/2001 | Glier et al. |
| 6,356,836 | B1 | 3/2002 | Adolph |
| 6,396,417 | B2 | 5/2002 | Lee |
| 6,453,233 | B1 | 9/2002 | Kato |
| 6,516,262 | B2 | 2/2003 | Takenaga et al. |
| 6,516,273 | B1 | 2/2003 | Pierowicz et al. |
| 6,556,917 | B1 | 4/2003 | Wawra et al. |
| 6,560,529 | B1 | 5/2003 | Janssen |

(Continued)

FOREIGN PATENT DOCUMENTS

| | | |
|---|---|---|
| CN | 1737500 A | 2/2006 |
| CN | 1942335 A | 4/2007 |

(Continued)

OTHER PUBLICATIONS

Feb. 2, 2011 European Search Report issued in EP 08 015 963.5.

(Continued)

*Primary Examiner* — Jeffrey Shapiro
(74) *Attorney, Agent, or Firm* — Oliff PLC

(57) ABSTRACT

Parking support systems, methods, and programs store road information and obtain information regarding a vacant space on a road. The systems, methods, and programs calculate parking availability in a predetermined area specified by the stored road information based on the obtained information; and provide notification of the calculated parking availability.

9 Claims, 8 Drawing Sheets

(56) References Cited

U.S. PATENT DOCUMENTS

| | | | | |
|---|---|---|---|---|
| 6,615,130 | B2 | 9/2003 | Myr | |
| 6,724,320 | B2 | 4/2004 | Basson et al. | |
| 6,728,623 | B2 | 4/2004 | Takenaga et al. | |
| 6,803,913 | B1 | 10/2004 | Fushiki et al. | |
| 6,925,378 | B2 | 8/2005 | Tzamaloukas | |
| 6,927,700 | B1 | 8/2005 | Quinn | |
| 6,927,774 | B2 | 8/2005 | Yano | |
| 6,970,101 | B1 * | 11/2005 | Squire et al. | 340/932.2 |
| 6,972,675 | B2 | 12/2005 | Mills et al. | |
| 6,989,766 | B2 | 1/2006 | Mese et al. | |
| 7,133,661 | B2 | 11/2006 | Hatae et al. | |
| 7,194,347 | B2 | 3/2007 | Harumoto et al. | |
| 7,254,482 | B2 | 8/2007 | Kawasaki et al. | |
| 7,304,653 | B2 | 12/2007 | Ueno | |
| 7,466,227 | B2 | 12/2008 | Chen et al. | |
| 2001/0034575 | A1 | 10/2001 | Takenaga et al. | |
| 2002/0115423 | A1 | 8/2002 | Hatae et al. | |
| 2002/0161520 | A1 * | 10/2002 | Dutta et al. | 701/213 |
| 2003/0078718 | A1 | 4/2003 | Takenaga et al. | |
| 2003/0162536 | A1 | 8/2003 | Panico | |
| 2003/0210173 | A1 | 11/2003 | Schneider | |
| 2004/0130552 | A1 | 7/2004 | Duluk et al. | |
| 2004/0143381 | A1 | 7/2004 | Regensburger et al. | |
| 2005/0243104 | A1 | 11/2005 | Kinghorn | |
| 2006/0114125 | A1 | 6/2006 | Kubota et al. | |
| 2006/0220911 | A1 * | 10/2006 | Jaupitre et al. | 340/932.2 |
| 2006/0250278 | A1 * | 11/2006 | Tillotson et al. | 340/932.2 |
| 2007/0177011 | A1 * | 8/2007 | Lewin et al. | 348/118 |
| 2008/0231469 | A1 * | 9/2008 | Knoll et al. | 340/932.2 |

FOREIGN PATENT DOCUMENTS

| | | | |
|---|---|---|---|
| CN | 101031818 | A | 9/2007 |
| DE | 196 16 447 | A1 | 10/1997 |
| DE | 100 28 130 | A1 | 12/2001 |
| DE | 10 2005 022171 | A1 | 4/2006 |
| EP | 0 738 946 | A1 | 10/1996 |
| EP | 0 782 118 | A1 | 7/1997 |
| EP | 0 921 509 | A2 | 6/1999 |
| EP | 1 127 727 | A2 | 8/2001 |
| EP | 1 742 191 | A2 | 1/2007 |
| JP | A-62-501650 | | 7/1987 |
| JP | A-62-187884 | | 8/1987 |
| JP | A-04-144479 | | 5/1992 |
| JP | A-05-094574 | | 4/1993 |
| JP | A-06-127318 | | 5/1994 |
| JP | A-08-194432 | | 7/1996 |
| JP | A-10-027294 | | 1/1998 |
| JP | A-10-187033 | | 7/1998 |
| JP | A-11-306498 | | 11/1999 |
| JP | A-2000-026894 | | 1/2000 |
| JP | A-2000-029450 | | 1/2000 |
| JP | A-2000-321081 | | 11/2000 |
| JP | A-2001-075967 | | 3/2001 |
| JP | A-2001-202544 | | 7/2001 |
| JP | A-2001-236600 | | 8/2001 |
| JP | A-2002-286459 | | 10/2002 |
| JP | A-2003-036500 | | 2/2003 |
| JP | A-2003-078654 | | 3/2003 |
| JP | A-2003-256257 | | 9/2003 |
| JP | A-2003-279363 | | 10/2003 |
| JP | A-2004-004240 | | 1/2004 |
| JP | A-2004-051006 | | 2/2004 |
| JP | A-2004-069549 | | 3/2004 |
| JP | A-2004-171289 | | 6/2004 |
| JP | A-2004-362287 | | 12/2004 |
| JP | A-2005-165639 | | 6/2005 |
| JP | A-2006-084257 | | 3/2006 |
| JP | A-2006-189326 | | 7/2006 |
| JP | A-2006-275690 | | 10/2006 |
| JP | A-2006-330908 | | 12/2006 |
| JP | A-2007-041916 | | 2/2007 |
| JP | A-2007-041961 | | 2/2007 |
| JP | A-2007-131169 | | 5/2007 |
| JP | A-2007-316025 | | 12/2007 |
| JP | A-2006-038558 | | 2/2009 |
| WO | WO 86/02764 | | 5/1986 |
| WO | WO 2005/044619 | A1 | 5/2005 |
| WO | WO 2005/101347 | A1 | 10/2005 |
| WO | WO 2006/080547 | A1 | 8/2006 |

OTHER PUBLICATIONS

Mar. 10, 2010 European Search Report issued in EP 08 01 5963.

Jul. 17, 2007 International Search Report issued in International Application No. PCT/JP2007/061626.

Jul. 9, 2009 Final Rejection issued in U.S. Appl. No. 11/397,601.

Aug. 6, 2009 Notification of Reasons for Rejection issued in Patent Application No. 2006-161603.

Aug. 20, 2009 Office Action (Decision of Rejection) issued in Japanese Patent Application No. 2005-111272.

Aug. 20, 2009 Notification of Reasons for Rejection issued in Patent Application No. 2007-171894.

Aug. 20, 2009 Notification of Reasons for Rejection issued in Patent Application No. 2007-091047.

Sep. 1, 2009 Notification of Reasons for Rejection issued in Patent Application No. 2007-255569.

Dec. 11, 2009 Rejection issued in U.S. Appl. No. 11/397,601.

Jan. 28, 2009 Rejection issued in U.S. Appl. No. 11/397,601.

Sep. 3, 2008 Rejection issued in U.S. Appl. No. 11/397,601.

Jun. 23, 2009 European Search Report issued in Application No. EP 08 00 4829.

Oct. 21, 2009 Notice of Allowanced issued in U.S. Appl. No. 12/155,642.

Apr. 29, 2009 Rejection issued in U.S. Appl. No. 12/155,642.

Oct. 16, 2007 Rejection issued in U.S. Appl. No. 11/176,212.

Mar. 7, 2008 Notice of Allowance issued in U.S. Appl. No. 11/176,212.

Kambic S. F.; "Rotated Matrix Characters/Graphics System" Apr. 1980, IBM Technical Disclosure Bulletin, IBM Corporation, New York, pp. 4988-4990.

Fernyhough, J. et al., "Building Qualitative Event Models Automatically from Visual Input", Proceedings of IEEE 6$^{th}$ International Conference on Computer Vision, Jan. 4-7, 1998, Bombay, India, pp. 350-355.

Kubota et al., U.S. Appl. No. 12/155,642, filed Jun. 6, 2008.

Yamaguchi et al., U.S. Appl No. 11/397,601, filed Apr. 5, 2006.

Takahata et al., U.S. Appl. No. 12/227,492, filed Feb. 23, 2009.

Nakamura et al., U.S. Appl. No. 12/076,067, filed Mar. 13, 2008.

Nakmura et al., U.S. Appl. No. 12/073,876, filed Mar. 11, 2008.

Dec. 11, 2012 Search Report issued in Chinese Application No. 2008101495129 (with translation).

* cited by examiner

PARKING SUPPORT SYSTEMS, PARKING SUPPORT METHODS, AND PARKING SUPPORT PROGRAMS

INCORPORATION BY REFERENCE

The disclosure of Japanese Patent Application No. 2007-255569, filed on Sep. 28, 2007, including the specification, drawings, and abstract thereof, is incorporated herein by reference in its entirety.

BACKGROUND

1. Related Technical Fields

Related technical fields include parking support systems, parking support methods, and parking support programs capable of obtaining information regarding a parking space.

2. Related Art

Japanese Unexamined Patent Application Publication No. 2007-131169 discloses a system that detects a parking space by using a positioning sensor. The system determines whether a vehicle can park the detected parking space and notifies a user whether the vehicle can park the detected parking space.

SUMMARY

According to the system of Japanese Unexamined Patent Application Publication No. 2007-131169, the only parking spaces that can be selected are the parking space located within the range of the sensor. Therefore, information regarding a parking space on a road far from the vehicle cannot be obtained by the sensor.

Accordingly, various exemplary implementations of the broad principles described herein provide a parking support system, a parking support method, and a parking support program capable of obtaining and notifying information regarding parking spaces on roads far from the vehicle.

Various exemplary implementations provide parking support systems, methods, and programs that store road information and obtain information regarding a vacant space on a road. The systems, methods, and programs calculate parking availability in a predetermined area specified by the stored road information based on the obtained information; and provide notification of the calculated parking availability.

BRIEF DESCRIPTION OF THE DRAWINGS

Exemplary implementations will now be described with reference to the accompanying drawings, wherein.

DETAILED DESCRIPTION OF EXEMPLARY IMPLEMENTATIONS

Note that, in the description below, the word "park" is intended to encompass both "parking" and "stopping" under the Japanese Road Traffic Law.

Figure 1:
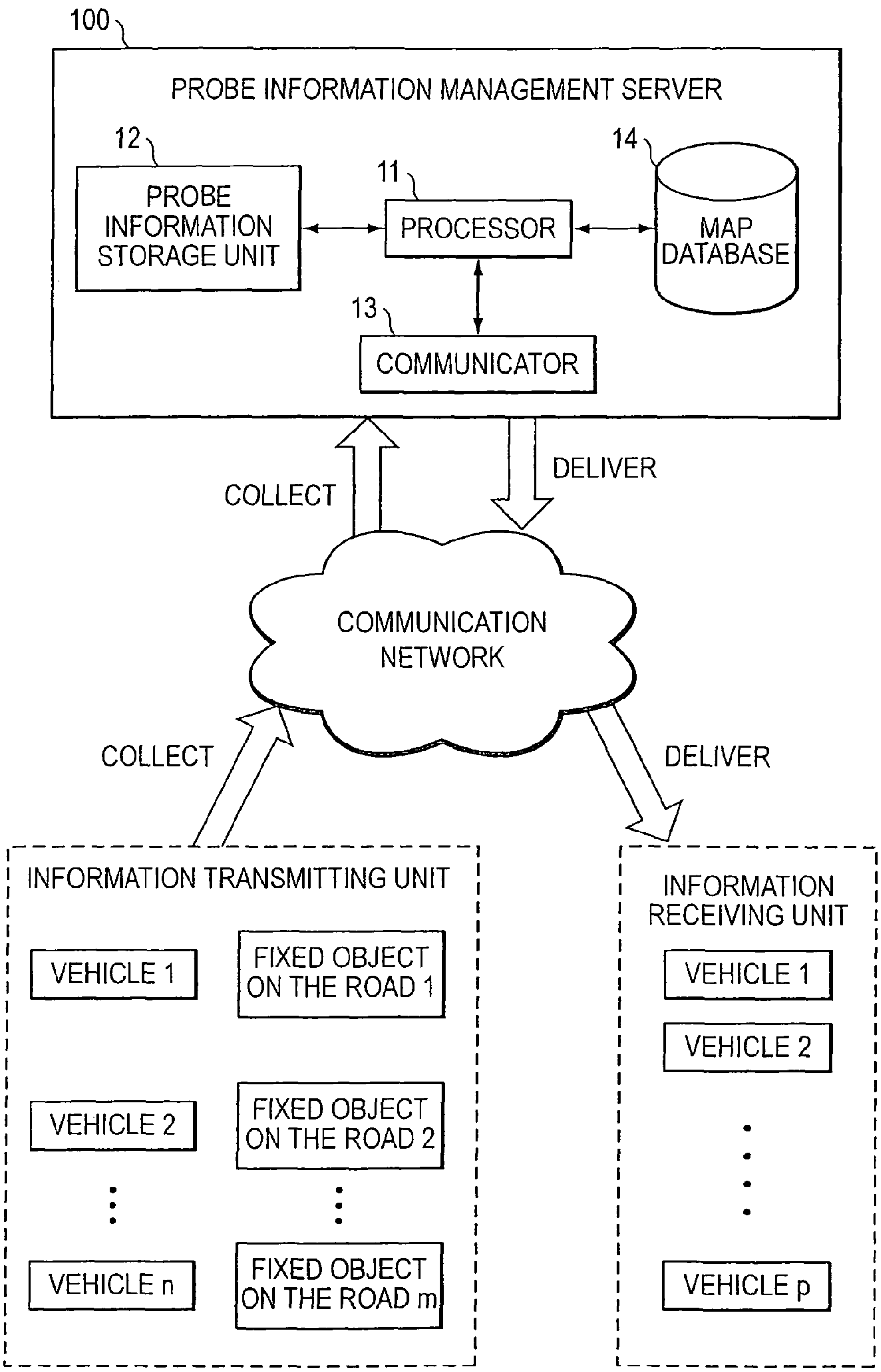
FIG. 1 is a diagram of an exemplary outline of a parking support system.

As shown in FIG. 1, the parking support system may basically include a probe information management server 100, information transmitting unit, and information receiving unit. A navigation apparatus mounted on vehicle and a fixed object on the road may function as the information transmitting unit. In addition, a navigation apparatus mounted on vehicle may function as the information receiving unit. Further, one navigation apparatus mounted on vehicle may function as both the information transmitting unit and the information receiving unit.

Alternatively, a navigation apparatus mounted on vehicle may function only as the information transmitting unit and/or a navigation apparatus mounted on vehicle may function only as the information receiving unit. The probe information management server 100, the information transmitting unit, and the information receiving unit may transmit and receive information via a communication network. The communication network may be a radio communication network and the signal band used in the communication in the present embodiment need not be limited.

First, the probe information management server 100 will be explained. As shown in FIG. 1, the probe information management server 100 may basically include a controller (e.g., processor 11), a probe information storage unit 12, a communicator 13, and a map DB 14.

The processor 11 may control the entire probe information management server 100. Various elements may be connected to the processor 11. The connected various elements may be controlled by the processor 11. In addition, the processor 11 may execute various programs for example stored in a ROM. Further, the processor 11 may calculate information indicating a parking availability in a predetermined section by using predetermined information. The examples of methods that may be implemented in the form of programs executed by the processor 11 to calculate the information indicating the parking availability will be described later.

The probe information storage unit 12 may store probe information transmitted by the information transmitting unit. The communicator 13 may be an interface for communicating with the information transmitting unit and the information receiving unit.

The map DB 14 may store various map data needed for route guidance, traffic information guidance, and map display. The map DB 14 may also store road information. The road information may include node data and link data. The node data may be the data indicating geographic points on the road and include coordinates as the positional information of the geographic points. The link data may be the data indicating roads connecting the above-described node data and include a link length, a road width, a road category of a link (an expressway, a general road, a parking prohibited road, or a narrow street, for example) and so forth. In addition, data for regulations on driving (one-way traffic and/or time zone regulation), data for road name, and so forth of the link itself may be included. Therefore, a road can be specified by the link data. Further, a node ID and a link ID may be respectively given to the node data and the link data. An ID of a fixed object on the road may be stored in association with the positional information. Furthermore, the information stored in the map DB 14 may be used when calculating information that indicates the parking availability per link data.

Figure 2:
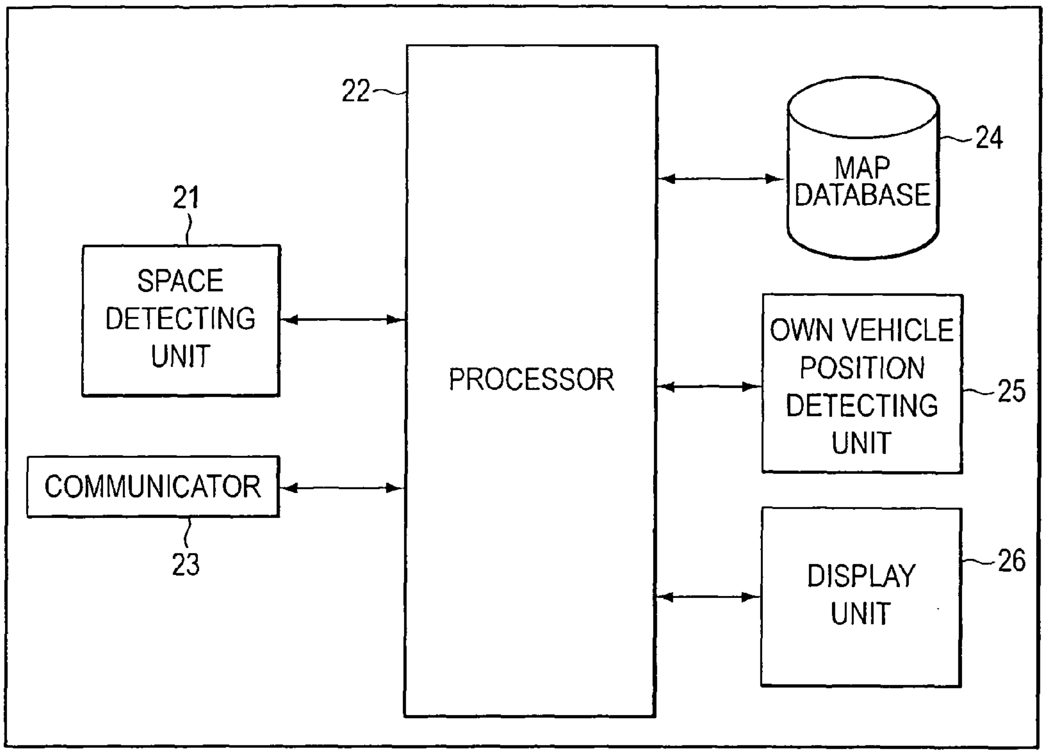
FIG. 2 is a diagram of an exemplary outline of a system on a vehicle.

FIG. 2 is a block diagram illustrating an exemplary structure of a navigation apparatus mounted on a vehicle. The navigation may basically include a space detecting unit 21, a controller (e.g., processor 22), a communicator 23, a map DB 24, an own vehicle position detecting unit 25, and display unit 26.

The space detecting unit 21 may detect information regarding a vacant parking space (a vacant parking space information) in an available parking section on the road. Known sensors such as a camera, ultrasound waves, and so forth may be used for detecting the vacant parking space. The vacant parking space information to be detected will be described in detail below.

The processor 22 may execute electronic controls of the entire vehicle. Various elements may be connected to the processor 22. The connected various elements may be controlled by the processor 22. In addition, the processor 22 may execute various programs, such as, for example, programs that implement one or more of the exemplary methods described below.

The communicator 23 may be an interface for communicating with the probe information management server 100.

The map DB 24 may store various map data needed for route guidance, traffic information guidance, and map display. The map DB 24 may also store road information. The road information may include node data and link data. The node data may be data indicating geographic points on the road (nodes) and include coordinates as the positional information of the geographic points. The link data may be data indicating roads connecting nodes and includes data for a link length, a road width, a road category of the link (an expressway, a general road, a parking prohibited road, or a narrow street, for example) and so forth. In addition, data for regulations on driving (one-way traffic, time zone regulation), data for road name, and so forth for the link itself may be included. Therefore, a road can be specified by the link data. Further, a node ID and a link ID may be respectively given to the node data and the link data. In addition, the data stored in the map DB 14 and the data stored in the map DB 24 may correspond. Note that the information stored in the map DB 24 may be used when calculating the information that indicates the parking availability in a predetermined section.

The own vehicle position detecting unit 25 may detect the position of the vehicle in which the navigation apparatus is mounted. A GPS, a distance sensor, a steering sensor, a gyro sensor as a bearing detector and so forth (Not shown in the diagram) may be used for detecting the own vehicle position. The display unit 26 may display the own vehicle position, a road, and so forth. The display unit 26 may also be used in the case of giving various warnings to a user. The display unit 26 may be structured with a liquid crystal display and/it may be touch panel compliant.

Figure 3:
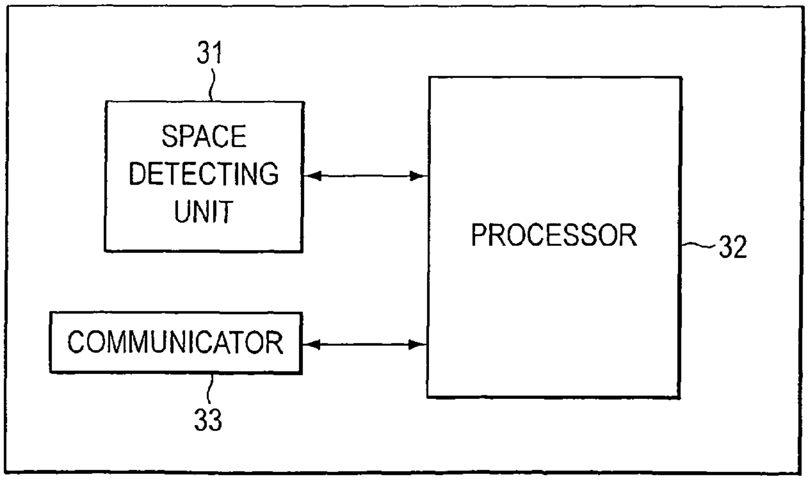
FIG. 3 is a diagram of an exemplary outline of a system of a fixed object on the road.

FIG. 3 illustrates an exemplary internal structure of a fixed object on the road. The fixed object on the road basically may include a space detecting unit 31, a controller (e.g., processor 32), and a communicator 33. An ID of a fixed object on the road may be given to each of the fixed objects on the road. When the ID of the fixed object on the road is transmitted to the probe information management server 100, the probe information management server 100 may read out the positional information corresponding to the ID of the fixed object on the road that has been received from the map DB 14 and specify the position of the fixed object on the road. The functions of the space detecting unit 31, the processor 32, and the communicator 33 may be basically the same as the functions of the space detecting unit 21, the processor 22, and the communicator 23 in the navigation apparatus mounted on the vehicle; therefore, the explanation will be omitted. A parking meter or a fixed point camera set at the roadside, for example, may be used as the fixed object on the road.

Next, an exemplary method of transmitting information will be described with reference to FIG. 4. The exemplary method may be implemented, for example, by one or more components of the above-described navigation apparatus. For example, the exemplary method may be implemented by the processor 22 executing a computer program stored in a RAM or ROM. However, even though the exemplary structure of the above-described navigation apparatus may be referenced in the description, it should be appreciated that the structure is exemplary and the exemplary method need not be limited by any of the above-described exemplary structure.

The method may be executed at predetermined intervals (20 ms, for example) while the vehicle travels. It may also be possible to manually switch ON/OFF of this execution of the method.

Figure 4:
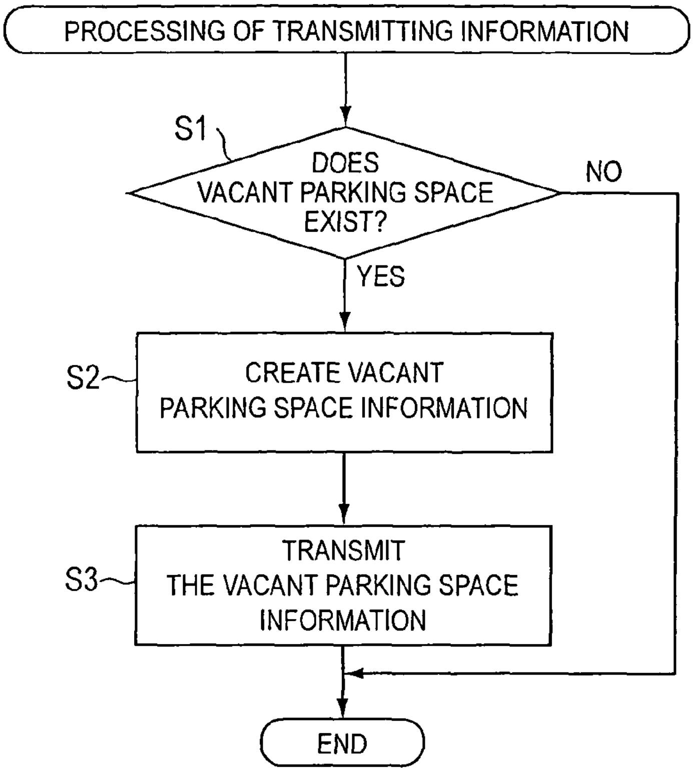
FIG. 4 is a flowchart of an exemplary method of transmitting information.

As shown in FIG. 4, in S1, it is determined whether a vacant parking space exists around the vehicle in which the navigation apparatus is installed (the "own vehicle"). The space detecting unit 21 may be used for detecting the vacant parking space. When a vacant parking space does not exist (S1: NO), the method of transmitting information may end.

When a vacant parking space exists (S1: YES), the sequence may proceed to S2. At S2, vacant parking space information may be created. The vacant parking space information may include link data as the road information corresponding to the detected vacant parking space, information for specifying the absolute position of the vacant parking space, the length of each detected parking space, information identifying the right side or left side toward the traveling direction of the own vehicle, information of the date and time of the detection, and so forth.

At S3, the vacant parking space information may be transmitted to the probe information management server 100. Note that the transmission data may be transmitted only when a transmission request is made from the probe information management server 100. After that, the sequence may return to S1 and stand by at S1 until the next vacant parking space is detected.

The processing of transmitting information in a fixed object on the road may be basically same as the processing of transmitting information in a navigation apparatus mounted on the vehicle. However, the ID of the fixed object on the road may be transmitted in place of the own vehicle positional information. With this processing, the probe information management server 100 that has received the ID of the fixed object on the road may read out the positional information corresponding to the received ID of the fixed object on the road from the map DB 14 and may specify the position of the fixed object on the road.

Figure 5:
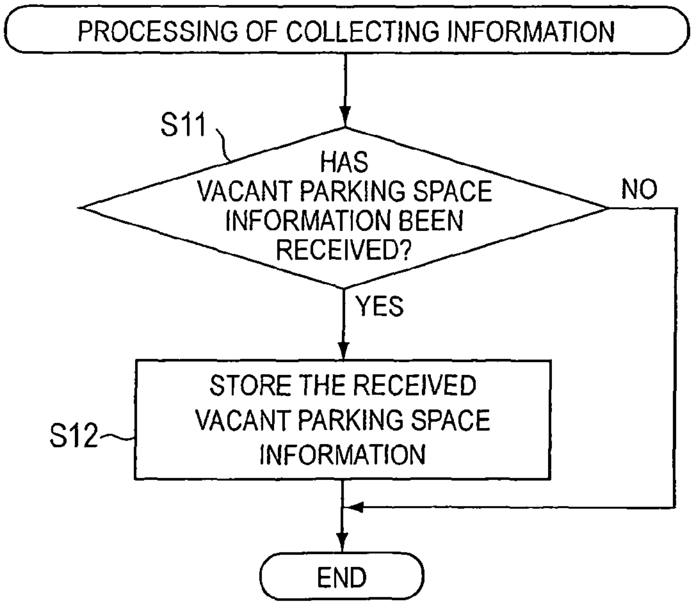
FIG. 5 is a flowchart of an exemplary method of collecting information.

Next, an exemplary method of collecting information will be described with reference to FIG. 5. The exemplary method may be implemented, for example, by one or more components of the above-described server 100. For example, the exemplary method may be implemented by the processor 11 executing a computer program stored in a RAM or ROM. However, even though the exemplary structure of the above-described server may be referenced in the description, it should be appreciated that the structure is exemplary and the exemplary method need not be limited by any of the above-described exemplary structure.

The method may be executed at predetermined intervals (20 ms, for example). As shown in FIG. 5, first, at S11, it is determined whether vacant parking space information has been received from any navigation apparatus mounted on vehicle or any fixed object on the road. When vacant parking space information has not been received (S11: NO), the method of collecting information may end.

When vacant parking space information has been received (S11: YES), the sequence may proceed to S12. At S12, the received vacant parking space information may be stored into the probe information storage unit 12. The vacant parking space information may include link data as the road information corresponding to the detected vacant parking space, information for specifying the absolute coordinates of the vacant parking space, the length of each parking space, information for identifying the right side or left side toward the traveling direction of the own vehicle, information of the date and time of the detection, and so forth. In addition, when the vacant parking space information with the same link data is already stored in the probe information storage unit 12, the date and time obtained by utilizing the above-described information of the date and time may be updated to new information of the vacant parking space.

Figure 6:
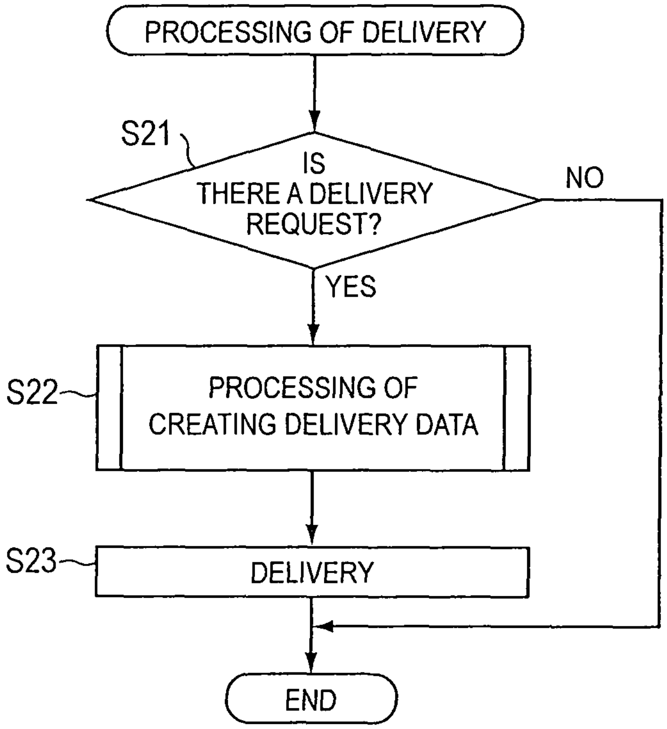
FIG. 6 is a flowchart of an exemplary method of delivery.

Next, an exemplary method of delivery will be described with reference to FIG. 6. The exemplary method may be implemented, for example, by one or more components of the above-described server 100. For example, the exemplary method may be implemented by the processor 11 executing a computer program stored in a RAM or ROM. However, even though the exemplary structure of the above-described server may be referenced in the description, it should be appreciated that the structure is exemplary and the exemplary method need not be limited by any of the above-described exemplary structure.

This method may be executed at predetermined intervals (20 ms, for example). In addition, the method of collecting information (FIG. 5) and the method of delivery may be executed in parallel.

The information to be delivered from the probe information management server 100 to the vehicle may be the information regarding available vacant parking space as described hereinafter. The situation of the available parking space may constantly vary according to the parking situation by other vehicles; therefore, the above-described information regarding the available parking space to be delivered may have uncertainty. Thus, it may be preferred that the information regarding the available parking space is presented as an indicator indicating the availability. In the present example, vacant parking space ratio may be made to be an indicator indicating the availability regarding the available parking space on the road.

First, at S21, it is determined whether there has been a delivery request of the vacant parking space ratio as the information regarding available parking spaces from a navigation apparatus mounted on a vehicle. When there has been no delivery request (S21: NO), the method of delivery may end. Alternatively, the delivering process may stand by at S21 until there is the delivery request including the vehicle ID and its positional information.

When there has been the delivery request (S21: YES), the sequence may proceed to S22. At S22, the source of the delivery request (e.g., a navigation apparatus mounted on the vehicle) may be specified, and data regarding the available parking space for delivering to the identified source of the delivery request may be created. The delivery data may be created according to the method of FIG. 7, discussed below.

At S23, the delivery data created at S22 may be delivered to the requesting navigation apparatus.

Figure 7:
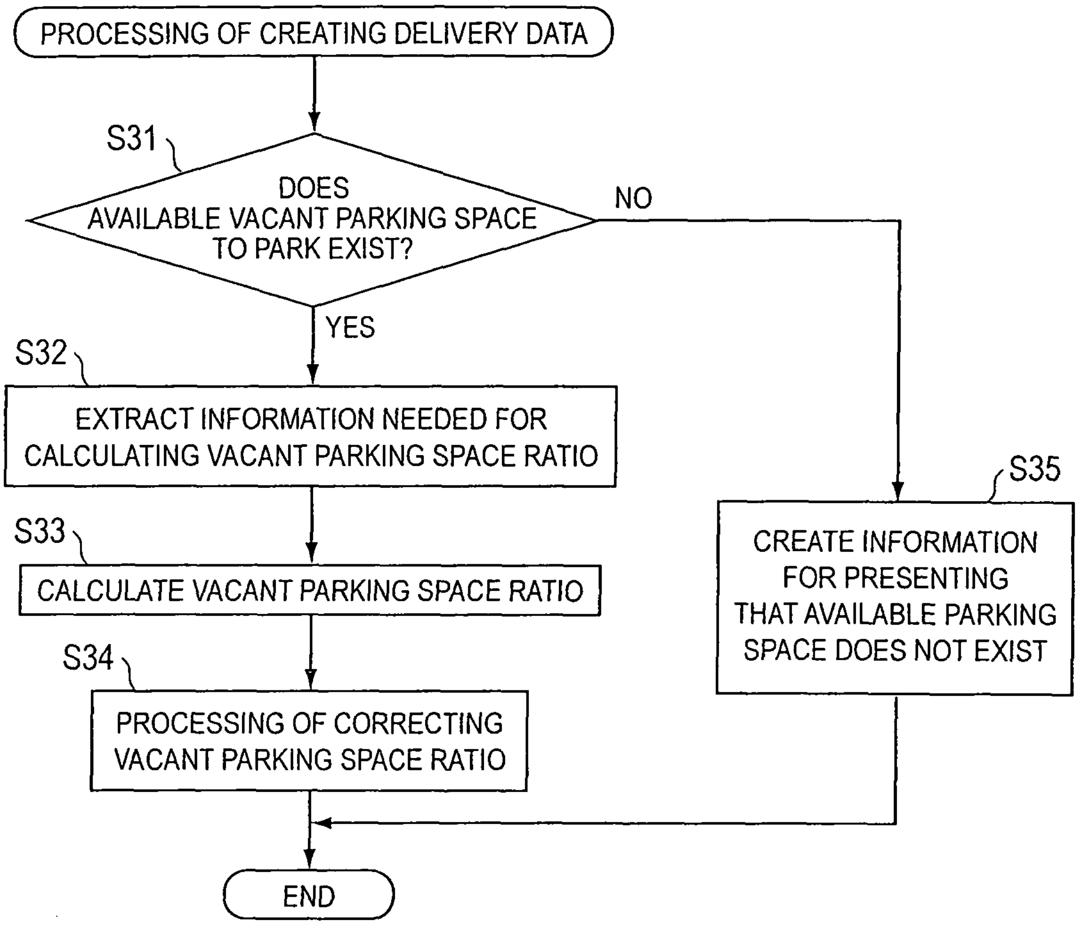
FIG. 7 is a flowchart of an exemplary method of generating delivery data.

An exemplary method of creating the delivery will be described with reference to FIG. 7. The exemplary method may be implemented, for example, by one or more components of the above-described server 100. For example, the exemplary method may be implemented by the processor 11 executing a computer program stored in a RAM or ROM. However, even though the exemplary structure of the above-described server may be referenced in the description, it should be appreciated that the structure is exemplary and the exemplary method need not be limited by any of the above-described exemplary structure.

At S31, it is determined whether there is an available parking section for the requesting vehicle. Specifically, the position of the requesting vehicle may be specified, and the determination may be made on the basis of whether there is an available parking section on a road within a predetermined distance from the specified position of the requesting vehicle. At this time, the position of the requesting vehicle may be specified according to the positional information included in the delivery request. In addition, the determination of whether there is an available parking section may be made using the information stored in the probe information storage unit 12 and the map DB 14.

When the there is no available parking section (S31: NO), the sequence may proceed to S35, where information for presenting that there is no available parking section may be created. When there is an available parking section (S31: YES), the sequence may proceed to S32. At S32, the information needed for calculating the vacant parking space ratio may be extracted from the information stored in the probe information storage unit 12 and the map DB 14. The information needed for calculating the vacant parking space ratio will be described later.

The vacant parking space ratio may be calculated at S33. The method for calculating the vacant parking space ratio will be described hereinafter. After that, the sequence may proceed to S34. At S34, the vacant parking space ratio calculated at S33 may be corrected as necessary. The method for correcting the vacant parking space ratio will be described hereinafter.

The vacant parking space ratio may be calculated with the formula (1) below. In the following, n (1, 2, . . . , n) vacant parking space/spaces may correspond to the link length included in the link data.

$$V = \frac{A}{B} \tag{1}$$

where V is the vacant parking space ratio, A is the sum of the available number of vehicles to park in 1, 2, . . . , n vacant parking space, and B is the available number of vehicles to park for the link length.

The available number of vehicles to park in one vacant parking space is the length of one vacant parking space divided by the space necessary for parking per one vehicle. This number may be rounded to the next lowest whole number or truncated to a predetermined number of decimal places. In addition, the available number of vehicles to park on the road corresponding to link data is the link length divided by the space necessary for parking per vehicle.

Figure 8A:
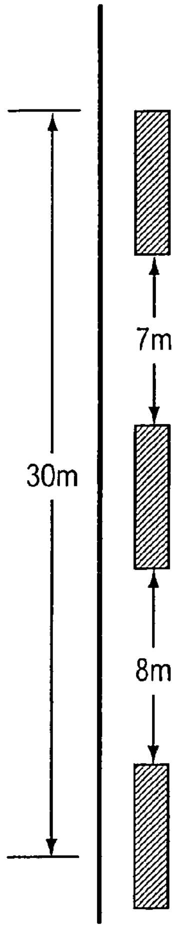
FIG. 8 is a diagram of an exemplary parking condition of a vehicle on the road.

A specific example of calculating the vacant parking space ratio will be described with reference to FIG. 8. In the example, the overall length of the vehicle is 4.5 m and the parking margin is 1.5 m. Thus, that the space necessary for parking per vehicle is 6 m (4.5 m+1.5 m). Note that the information on this space necessary for parking may be stored in the map DB 14. In the situation shown in FIG. 8A, there may be two vacant parking spaces on the road and the lengths may be 7 m and 8 m each. The vacant parking space ratio V in this case may be:

$$\frac{\left(\frac{7}{6}+\frac{8}{6}\right)}{\left(\frac{30}{6}\right)}=\frac{1+1}{5}=40\%$$

Figure 8B:
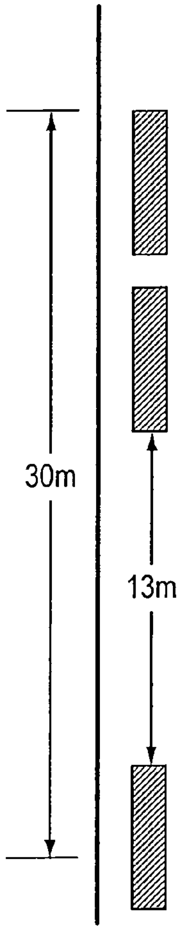

In addition, in the situation shown in FIG. 8B, there may be one vacant parking space on the road and the length may be 13 m. The vacant parking space ratio in this case may be:

$$\frac{\left(\frac{13}{6}\right)}{\left(\frac{30}{6}\right)}=\frac{2}{5}=40\%$$

Note that a space less than a predetermined length may be excluded from the vacant parking space. For example, a space less than 2 m may be excluded from the vacant parking space in the present example.

Figure 8C:
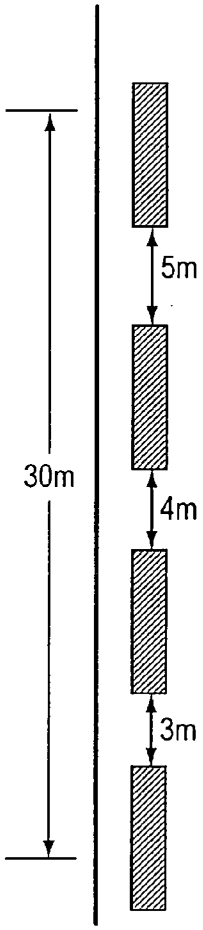

Further, in the situation shown in FIG. 8C, there may be three vacant parking spaces on the road and the lengths may be 3 m, 4 m, and 5 m each. The vacant parking space ratio in this case may be:

$$\frac{\left(\frac{3}{6}+\frac{4}{6}+\frac{5}{6}\right)}{\left(\frac{30}{6}\right)}=\frac{(0+0+0)}{5}=0\%$$

Furthermore, in the above-described processing, the space necessary for parking per vehicle was defined with the constant overall length of the vehicle regardless the type of vehicle. However, the space necessary for parking per vehicle may be set depending on a vehicle by receiving and utilizing the information such as the type of vehicle including the overall length of the vehicle together with the delivery request. Note that the calculation formula for the vacant parking space ratio described above is an example and other formulas may also be used for calculating the vacant parking space ratio.

Next, processing of correcting the vacant parking space ratio at S34 in FIG. 7 will be described. The vacant parking space ratio herein may be corrected in consideration of the statistical information of the surrounding condition on the road. For example, it may be corrected by using the statistical information regarding the generation/disappearance of a vacant parking space in the past. Specifically, the road where parking spaces are frequently vacated within a predetermined time period may make the vacant parking space ratio increase, for example. In addition, the statistical information may be cumulated based on the date information such as time and day; therefore, it may be corrected on the basis of the data including the date information associated with each link.

Further, a road with heavy traffic volume within a predetermined time period may have great possibility for vacant parking spaces be filled. Therefore, the vacant parking space ratio may be decreased as well. Note that the information regarding the traffic volume may be obtained from VICS® (Vehicle Information Communication System) or determined on the basis of road width or traffic lanes included in the link data.

Figure 9:
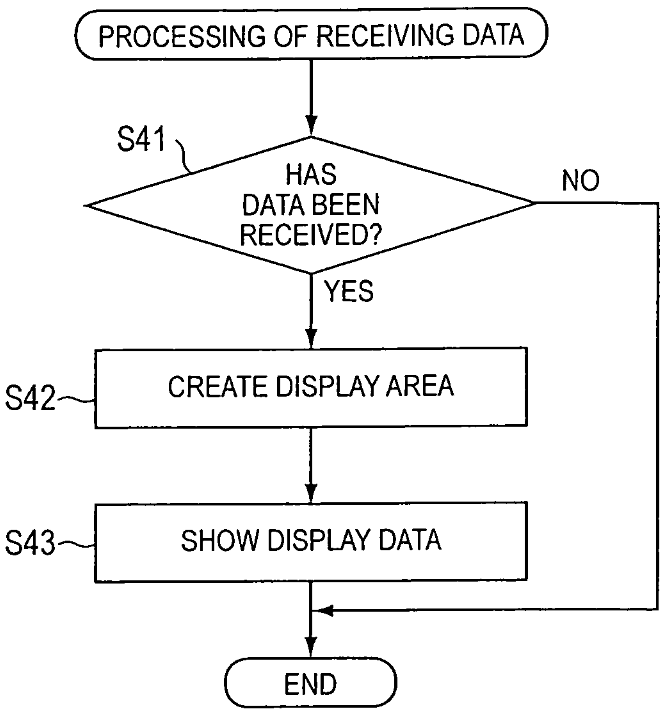
FIG. 9 is a flowchart of an exemplary method of receiving data.

Next, an exemplary method of receiving will be described with reference to FIG. 9. The exemplary method may be implemented, for example, by one or more components of the above-described navigation apparatus. For example, the exemplary method may be implemented by the processor 22 executing a computer program stored in a RAM or ROM. However, even though the exemplary structure of the above-described navigation apparatus may be referenced in the description, it should be appreciated that the structure is exemplary and the exemplary method need not be limited by any of the above-described exemplary structure.

This processing may be executed at predetermined intervals (20 ms, for example). First, at S41, it is determined whether information regarding available parking spaces has been received. When it has not been received (S41: NO), the method of receiving data may end. When information regarding available parking spaces has been received (S41: YES), the sequence may proceed to S42.

At S42, display data for displaying on the display unit 26 may be created on the basis of the information regarding the available parking space delivered from the probe information management server 100. The display data will be described below. After the display data is created, at S43, the created display data may be displayed on the display unit 26.

Figure 10A:
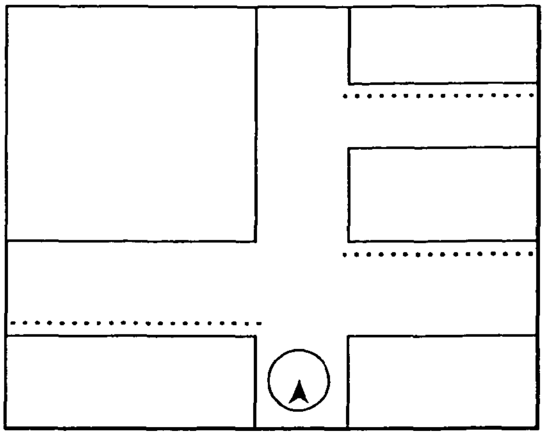
FIGS. 10A-10C are diagrams showing examples of a display of a vacant parking space ratio.

FIG. 10 illustrates exemplary display data. An own vehicle position may be detected by the own vehicle position detecting unit 25 and a map around the own vehicle may be displayed on the display unit 26 by using the map DB 24. Then, the link ID for the section where the above-described vacant parking space exists is used to display a corresponding road on the map. The vacant parking space on the map may be shown in a dotted line on the road as shown in FIG. 10A, for example. In addition, the color of the dotted line to be drawn may be corresponded to the vacant parking space ratio. In that case, light blue may be shown when the vacant parking space is equal to or more than 60% through equal to or less than 100%, orange may be shown when it is equal to or more than 30% through less than 60%, and red can be shown for the case of equal to or more than 0% through less than 30%, for example. Note that the corresponding relation between the color to be shown and the vacant parking space ratio may be set conveniently.

Figure 10B:
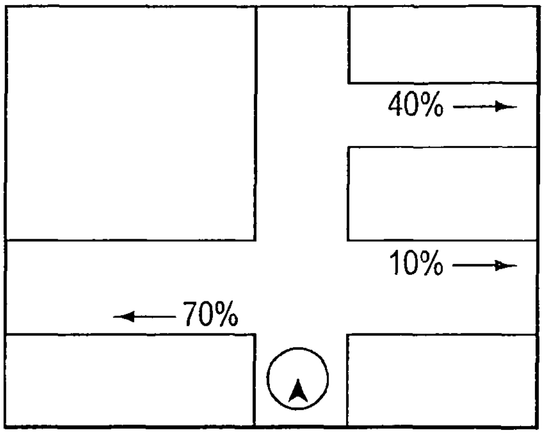
Figure 10C:
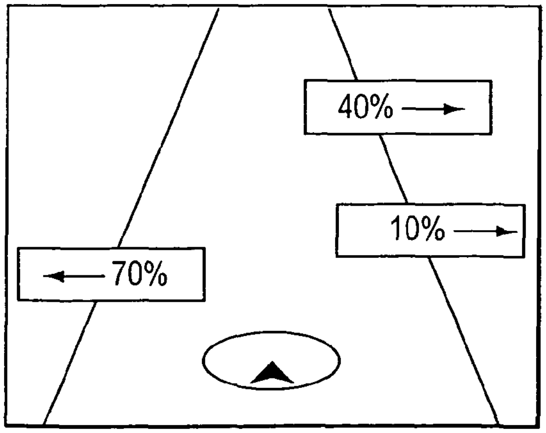

In addition, the value of the vacant parking space ratio may be directly displayed on the corresponded map coordinates as shown in FIG. 10B. Further, as shown in FIG. 10C, the map may be displayed in three dimensions and the value of the vacant parking space ratio may be displayed on the corresponded map coordinates.

In addition, a specific area for displaying the vacant parking space ratio may be changed depending on the positional information or the date information. Specifically, when traveling downtown or the like during the daytime, for example, it may be assumed that there are many parked vehicles. Therefore, the vacant parking space may be displayed by extending the specific area.

Note that the above-described flowcharts are examples and need not be limited to the specific processing shown. In addition, change of the order, deletion, or placement of a part of the steps, and addition of other step/steps in the above-described flowcharts may be made as necessary without departing from the broad inventive principles described herein.

As described above, in the parking support system according to the present example, the information regarding available parking spaces on the road may be obtained by navigation apparatuses mounted on the vehicle and/or fixed objects on the road. The parking availability may be calculated on the basis of the road information and this obtained information and indicators indicating the calculated parking availability may be displayed. Therefore, a driver can understand parking availability on the road far from the own vehicle.

The above exemplary methods may be implemented as computer-executable programs executed by a controller.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles. For example, the processor 22 may calculate the vacant parking space ratio.

What is claimed is:

1. A parking support system for a vehicle, comprising:

a non-transitory memory that stores road information including link data; and a controller that is specifically programmed to:

obtain information regarding a vacant space on a road;

obtain information regarding a space necessary for parking per one vehicle;

calculate an available number of the one vehicle to park in a predetermined section specified by the link data based on the road information and the information regarding the space necessary for parking per the one vehicle;

calculate a sum of an available number of the one vehicle to park in the predetermined section specified by the link data based on the vacant space on the road and the information regarding the space necessary for parking per the one vehicle;

calculate a vacant parking space ratio in the predetermined section specified by the link data based on the calculated available number and the calculated sum;

obtain traffic volume in the predetermined section;

correct the calculated vacant parking space ratio based on the obtained traffic volume; and provide notification of the calculated vacant parking space ratio.

2. The parking support system according to claim 1, wherein the controller is specifically programmed to:

specify a length of the predetermined section based on the stored road information;

specify a length of each vacant space in the predetermined section based on the obtained information; and calculate the vacant parking space ratio based on the specified length of the predetermined section and the specified length of each vacant space.

3. The parking support system according to claim 2, further comprising:

a position detector that detects a vehicle position;

wherein the controller is specifically programmed to display on a display unit the notification of the calculated vacant parking space ratio within a predetermined range of the vehicle position based on the detected vehicle position.

4. The parking support system according to claim 1, further comprising:

a position detector that detects a vehicle position;

wherein the controller is specifically programmed to display on a display unit the notification of the calculated vacant parking space ratio within a predetermined range of the vehicle position based on the detected vehicle position.

5. A parking support method for a vehicle, comprising:

storing road information including link data;

obtaining information regarding a vacant space on a road;

obtaining information regarding a space necessary for parking per one vehicle;

calculating an available number of the one vehicle to park in a predetermined section specified by the link data based on the road information and the information regarding the space necessary for parking per the one vehicle;

calculating a sum of an available number of the one vehicle to park in the predetermined section specified by the link data based on the vacant space on the road and the information regarding the space necessary for parking per the one vehicle;

calculating a vacant parking space ratio in the predetermined section specified by the link data based on the calculated available number and the calculated sum;

obtaining traffic volume in the predetermined section;

correcting the calculated vacant parking space ratio based on the obtained traffic volume; and providing notification of the calculated vacant parking space ratio, wherein the method is implemented by a controller that is specifically programmed to perform all of the steps.

6. The parking support method according to claim 5, further comprising:

specifying a length of the predetermined section based on the stored road information;

specifying a length of each vacant space in the predetermined section based on the obtained information; and calculating the vacant parking space ratio based on the specified length of the predetermined section and the specified length of each vacant space.

7. The parking support method according to claim 6, further comprising:

detecting a vehicle position; and displaying on a display unit the notification of the calculated vacant parking space ratio within a predetermined range of the vehicle position based on the detected vehicle position.

8. The parking support method according to claim 5, further comprising:

detecting a vehicle position;

displaying on a display unit the notification of the calculated vacant parking space ratio within a predetermined range of the vehicle position based on the detected vehicle position.

9. A non-transitory computer-readable storage medium storing a computer executable program having instructions, which when executed, perform the following steps in order to operate a controller to support parking:

storing road information including link data;

obtaining information regarding a vacant space on a road;

calculating an available number of the one vehicle to park in a predetermined section specified by the link data based on the road information and the information regarding the space necessary for parking per the one vehicle;

calculating a sum of an available number of the one vehicle to park in the predetermined section specified by the link data based on the vacant space on the road and the information regarding the space necessary for parking per the one vehicle;

calculating a vacant parking space ratio in the predetermined section specified by the link data based on the calculated available number and the calculated sum;

obtaining traffic volume in the predetermined section;

correcting the calculated vacant parking space ratio based on the obtained traffic volume; and providing notification of the calculated vacant parking space ratio.

* * * * *